United States Patent
Shu et al.

(10) Patent No.: US 10,715,232 B2
(45) Date of Patent: Jul. 14, 2020

(54) ANTENNA CONFIGURATION METHOD, TERMINAL DEVICE, AND ANTENNA CIRCUIT

(71) Applicant: HUAWEI TECHNOLOGIES CO., LTD., Shenzhen, Guangdong (CN)

(72) Inventors: Haw-Wei Shu, Shanghai (CN); Chien-Jen Huang, Shanghai (CN); Yuan-Hao Lan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/332,702

(22) PCT Filed: Sep. 13, 2016

(86) PCT No.: PCT/CN2016/098797
§ 371 (c)(1),
(2) Date: Mar. 12, 2019

(87) PCT Pub. No.: WO2018/049551
PCT Pub. Date: Mar. 22, 2018

(65) Prior Publication Data
US 2019/0222280 A1 Jul. 18, 2019

(51) Int. Cl.
*H04W 4/00* (2018.01)
*H04B 7/06* (2006.01)
(Continued)

(52) U.S. Cl.
CPC ........... *H04B 7/0604* (2013.01); *H04B 1/006* (2013.01); *H04B 1/0064* (2013.01); *H04B 1/406* (2013.01);
(Continued)

(58) Field of Classification Search
CPC .... H04B 7/0064; H04B 1/006; H04B 1/0064; H04B 1/406; H04B 7/0404; H04B 7/0413;
(Continued)

(56) References Cited

U.S. PATENT DOCUMENTS 8,064,835 B2   11/2011  Rezvani et al.
8,213,344 B2 *  7/2012  Zhu .................... H04W 8/30
                                                   370/278
(Continued)

FOREIGN PATENT DOCUMENTS

CN       1641512 A   *  7/2005  ............... G06F 1/00
CN       1641512 A      7/2005
(Continued)

OTHER PUBLICATIONS

Office Action issued in Japanese Application No. 2019-514014 dated Aug. 26, 2019, 10 pages (With English Translation).
(Continued)

*Primary Examiner* — Marceau Milord
(74) *Attorney, Agent, or Firm* — Fish & Richardson P.C.

(57) ABSTRACT

Example methods and apparatus for configuring an antenna are disclosed. One method includes determining a communication status of each of a plurality of communications modules in a terminal device. An antenna use priority of each communications module is determined based on the communication status of the communications module. An antenna for each communications module is configured based on the antenna use priority of the communications module.

14 Claims, 8 Drawing Sheets

(51) Int. Cl.
*H04W 72/10* (2009.01)
*H04B 7/08* (2006.01)
*H04B 1/403* (2015.01)
*H04B 1/00* (2006.01)
*H04B 7/0404* (2017.01)
*H04B 7/0413* (2017.01)
*H04W 68/02* (2009.01)
*H04W 72/08* (2009.01)
*H04W 88/06* (2009.01)

(52) U.S. Cl.
CPC ......... *H04B 7/0404* (2013.01); *H04B 7/0413* (2013.01); *H04B 7/0602* (2013.01); *H04B 7/0691* (2013.01); *H04B 7/0802* (2013.01); *H04B 7/0874* (2013.01); *H04W 68/02* (2013.01); *H04W 72/082* (2013.01); *H04W 72/10* (2013.01); *H04W 88/06* (2013.01)

(58) Field of Classification Search
CPC .. H04B 7/0602; H04B 7/0691; H04B 7/0802; H04B 7/0874; H04B 7/0817; H04W 68/02; H04W 72/082; H04W 72/10; H04W 88/06
USPC ......... 455/426.1, 552.1, 557, 41.2, 62, 63.3, 455/575.7, 115.3, 562.1
See application file for complete search history.

(56) References Cited

U.S. PATENT DOCUMENTS

| | | | |
|---|---|---|---|
| 8,682,274 B2 | 3/2014 | Sultenfuss et al. | |
| 8,744,375 B2 | 6/2014 | Raghuraman | |
| 8,903,329 B2* | 12/2014 | Maguire | H04B 5/02 455/103 |
| 9,148,889 B2 | 9/2015 | Wietfeldt et al. | |
| 9,240,830 B2* | 1/2016 | Ljung | H04B 7/0608 |
| 9,287,953 B2* | 3/2016 | Ngai | H04B 7/0404 |
| 9,756,544 B2* | 9/2017 | Ananthanarayanan | H04W 36/30 |
| 10,098,172 B2* | 10/2018 | Lee | H04W 72/12 |
| 10,117,280 B2* | 10/2018 | Liu | H04W 72/0446 |
| 2009/0042555 A1 | 2/2009 | Zhu et al. | |
| 2011/0250926 A1 | 10/2011 | Wietfeldt et al. | |
| 2012/0329395 A1 | 12/2012 | Husted et al. | |
| 2013/0308554 A1 | 11/2013 | Ngai | |
| 2014/0225775 A1* | 8/2014 | Clevorn | H01Q 3/34 342/372 |
| 2014/0273884 A1* | 9/2014 | Mantravadi | H04B 1/38 455/73 |
| 2014/0349584 A1 | 11/2014 | Clevorn et al. | |
| 2015/0010099 A1* | 1/2015 | Lin | H04B 7/0404 375/267 |
| 2015/0017978 A1* | 1/2015 | Hong | H04W 88/06 455/426.1 |
| 2015/0056933 A1 | 2/2015 | Yan et al. | |
| 2015/0092573 A1* | 4/2015 | Zhang | H04W 24/10 370/252 |
| 2015/0180514 A1* | 6/2015 | Pavacic | H04B 1/0064 455/552.1 |
| 2015/0207536 A1* | 7/2015 | Yehezkely | H03H 11/02 455/78 |
| 2015/0208286 A1* | 7/2015 | Ozturk | H04W 36/0022 370/331 |
| 2016/0127972 A1* | 5/2016 | Ananthanarayanan | H04W 36/30 370/332 |
| 2016/0301456 A1* | 10/2016 | Clevorn | H04B 7/0689 |
| 2016/0338133 A1* | 11/2016 | Lee | H04W 72/12 |

FOREIGN PATENT DOCUMENTS

| | | | | |
|---|---|---|---|---|
| CN | 102668408 A | | 9/2012 | |
| CN | 104185230 A | | 12/2014 | |
| CN | 104954040 A | | 9/2015 | |
| CN | 105075129 A | | 11/2015 | |
| JP | 2013016969 A | * | 1/2013 | ............... H04N 1/21 |
| JP | 2013016989 A | | 1/2013 | |
| JP | 2014230279 A | * | 12/2014 | ............... H04B 1/40 |
| JP | 2014230279 A | | 12/2014 | |
| JP | 2015521006 A | * | 7/2015 | ........... H04B 1/0053 |
| JP | 2015521006 A | | 7/2015 | |
| KR | 20150129306 A | * | 11/2015 | ............... H04B 1/00 |
| WO | 2014163750 A1 | | 10/2014 | |

OTHER PUBLICATIONS

Extended European Search Report issued in Application No. 16915937.3, dated Jul. 9, 2019, 15 pages.
PCT International Search Report and Written Opinion issued in International Application No. PCT/CN2016/098797 dated May 31, 2017, 17 pages (with English translation).
Office Action issued in Chinese Application No. 201680088818.0 dated Mar. 23, 2020, 9 pages.

* cited by examiner

ANTENNA CONFIGURATION METHOD, TERMINAL DEVICE, AND ANTENNA CIRCUIT

CROSS-REFERENCE TO RELATED APPLICATIONS

This application is a national stage of International Application No. PCT/CN2016/098797, filed on Sep. 13, 2016, which is hereby incorporated by reference in its entirety.

TECHNICAL FIELD

Embodiments of the present invention relate to the communications field, and more specifically, to an antenna configuration method, a terminal device, and an antenna circuit.

BACKGROUND

A multiple-input multiple-output (Multiple Input Multiple Output, "MIMO" for short) technology mainly improves data throughput experience of a user by using hardware conditions such as a plurality of antennas (for example, four antennas) and a plurality of radio frequency channels (for example, four receive channels) in combination with a chip baseband algorithm. Performance of the MIMO mainly depends on antenna performance, including antenna efficiency (Antenna Efficiency) of each antenna, an antenna efficiency difference (Antenna Imbalance), an antenna correlation (Envelope Correlation Coefficient, "ECC" for short), and antenna isolation (Antenna Isolation). The antenna performance mainly depends on an antenna space of a mobile phone. However, because the antenna space of the mobile phone is limited, it is very difficult to implement multiple-antenna MIMO of different communications modules on the mobile phone terminal.

Currently, a method for implementing multiple-antenna MIMO of different communications modules mainly includes an antenna frequency division mode and an antenna time division mode. Using an LTE communications module and a wireless fidelity (Wireless Fidelity, "WiFi" for short) communications module as an example, the frequency division mode refers to performing, by using a filter, filtering processing on an LTE signal and a WiFi signal that are received by an antenna, leading the WiFi signal obtained after the filtering into a WiFi radio frequency branch, and leading a signal obtained after the WiFi signal is filtered out into an LTE radio frequency branch. In this solution, the filter adds an additional radio frequency insertion loss to each radio frequency branch, affecting both LTE service quality and WiFi service quality. The time division mode refers to controlling an antenna to switch between the different communications modules by using a single pole, double throw switch. Still using the LTE communications module and the WiFi communications module as an example, the time division mode is controlling the antenna to switch between the LTE communications module and the WiFi communications module by using a single pole, double throw switch. Control logic of the single pole, double throw switch is giving priority to the LTE communications module, and use of the antenna by the WiFi communications module is always in a low priority. To be specific, when an LTE service occurs, the antenna is switched to a cellular network communications chip by using the single pole, double throw switch, and the antenna is occupied by the LTE service. In this case, a WiFi service cannot use the antenna. If a user is using the WIFI service in this case, use experience of the user is severely affected.

SUMMARY

This application provides an antenna configuration method, a terminal device, and an antenna circuit. Based on a communication status of a communications module in the terminal device, antennas are dynamically configured for different communications modules, thereby improving scenario experience of a service user.

According to a first aspect, an antenna configuration method is provided. The method includes: determining a communication status of each of a plurality of communications modules in a terminal device; determining an antenna use priority of each communications module based on the communication status of the communications module; and configuring an antenna for each communications module based on the antenna use priority of the communications module.

Therefore, according to the antenna configuration method in this application, the antenna use priority of each communications module is determined based on the communication status of the communications module in the terminal device, and the antenna is configured for each communications module based on the antenna use priority of the communications module, so that a communications module having a high antenna use priority occupies more antenna resources than a communications module having a low antenna use priority, thereby improving scenario experience of a service user of the communications module having the high antenna use priority.

With reference to the first aspect, in a first possible implementation of the first aspect, the determining an antenna use priority of each communications module based on the communication status of the communications module includes: determining the antenna use priority of each communications module based on the communication status and a preset correspondence, where the preset correspondence includes a correspondence between the communication status and the antenna use priority.

With reference to the first aspect or the first possible implementation of the first aspect, in a second possible implementation of the first aspect, the configuring an antenna for each communications module based on the antenna use priority of the communications module includes: determining, based on the antenna use priority of each communications module, a quantity of antennas allocated to the communications module; and configuring the antenna for each communications module based on the quantity of antennas allocated to the communications module.

With reference to the second possible implementation of the first aspect, in a third possible implementation of the first aspect, the determining, based on the antenna use priority of each communications module, a quantity of antennas allocated to the communications module includes: determining, based on the antenna use priority of each communications module, a maximum quantity of antennas supported by the communications module, and an antenna quantity allocation principle for the communications module, the quantity of antennas allocated to the communications module.

With reference to the third possible implementation of the first aspect, in a fourth possible implementation of the first aspect, the antenna quantity allocation principle is: determining, based on the antenna use priority of each communications module, a minimum quantity of antennas allocated to the communications module; determining, based on an average allocation manner and a quantity of remaining antennas, a quantity of antennas allocated to each communications module in a first antenna use priority set; and when the quantity of antennas allocated to each communications module in the first antenna use priority set is a maximum quantity of antennas supported by the communications module in the first antenna use priority set, determining, based on the average allocation manner and a quantity of remaining antennas, a quantity of antennas allocated to each communications module in a second antenna use priority set, where the communications modules in the first antenna use priority set have a same antenna use priority, the communications modules in the second antenna use priority set have a same antenna use priority, and an antenna use priority of each communications module in the first antenna use priority set is higher than an antenna use priority of each communications module in the second antenna use priority set.

According to the antenna quantity allocation principle in this embodiment of this application, it can be ensured that the antenna use priority of the communications module corresponds to antenna quantity allocation in a positive correlation manner, thereby improving the scenario experience of the service user.

With reference to any one of the second to the fourth possible implementation of the first aspect, in a fifth possible implementation of the first aspect, the method further includes: determining an antenna performance measurement result for each communications module; and the configuring the antenna for each communications module based on the quantity of antennas allocated to the communications module includes: configuring the antenna for each communications module based on the antenna use priority of the communications module, the quantity of antennas allocated to the communications module, and the antenna performance measurement result and an antenna selection principle for the communications module.

Optionally, each communications module evaluates antenna performance by using parameters such as a strength of a received signal, a signal-to-noise ratio of the received signal, a bit error rate of the received signal, and quality of a transmitted signal.

With reference to the fifth possible implementation of the first aspect, in a sixth possible implementation of the first aspect, the antenna selection principle is: for each communications module, selecting, in descending order of the antenna use priorities and descending order of antenna performance, a minimum preferred quantity of antennas corresponding to the communications module; selecting an antenna for each communications module in the first antenna use priority set from one or more remaining antennas in an alternate selection manner; and when a quantity of antennas selected for each communications module in the first antenna use priority set is the quantity of antennas allocated to the communications module in the first antenna use priority set, selecting an antenna for each communications module in the second antenna use priority set from one or more remaining antennas in the alternate selection manner, where the communications modules in the first antenna use priority set have a same antenna use priority, the communications modules in the second antenna use priority set have a same antenna use priority, and an antenna use priority of each communications module in the first antenna use priority set is higher than an antenna use priority of each communications module in the second antenna use priority set.

According to the antenna selection principle in this embodiment of this application, an antenna having high performance can be configured for a communications module having a high antenna use priority, thereby improving the scenario experience of the service user.

With reference to any one of the first aspect or the first to the sixth possible implementations of the first aspect, in a seventh possible implementation of the first aspect, the method further includes: when determining that a first communications module in the plurality of communications modules does not use, in a preset time period, an antenna configured for the first communications module, configuring the antenna configured for the first communications module for a second communications module in the plurality of communications modules, where an antenna use priority of the first communications module is higher than an antenna use priority of the second communications module; and when determining that the first communications module needs to use the antenna configured for the first communications module, reconfiguring the antenna configured for the first communications module for the first communications module.

Therefore, multiple-antenna sharing can be implemented between the communications modules, thereby improving antenna use efficiency.

With reference to any one of the first aspect or the first to the seventh possible implementations of the first aspect, in an eighth possible implementation of the first aspect, before the determining a communication status of each of a plurality of communications modules in a terminal device, the method further includes: determining a status of the terminal device; and the configuring an antenna for each communications module based on the antenna use priority of the communications module includes: configuring the antenna for each communications module based on the antenna use priority of the communications module and the status of the terminal device.

Optionally, a current status of the terminal device includes a battery level status of the terminal device and/or a current screen status of the terminal device.

Therefore, an appropriate quantity of antennas can be configured for each communications module with reference to the status of the terminal device and the antenna use priority of the communications module, thereby improving the scenario experience of the service user.

With reference to any one of the first aspect or the first to the eighth possible implementations of the first aspect, in a ninth possible implementation of the first aspect, the preset correspondence is: when the communication status is performing a voice service in a condition that a received signal strength indicator RSSI of a signal is less than a first preset value, a communications module corresponding to the communication status has a first antenna use priority; and when the communication status is performing the voice service in a condition that the RSSI of the signal is greater than or equal to the first preset value, a communications module corresponding to the communication status has a second antenna use priority, where the first antenna use priority is higher than the second antenna use priority.

With reference to any one of the first aspect or the first to the ninth possible implementations of the first aspect, in a tenth possible implementation of the first aspect, the plurality of communications modules include a communications module supporting a cellular communications technology and a communications module supporting a near field communications technology.

With reference to the tenth possible implementation of the first aspect, in an eleventh possible implementation of the first aspect, the communications module supporting the cellular communications technology is a Long Term Evolution LTE communications module, and the communications module supporting the near field communications technology is a wireless fidelity WiFi communications module.

Optionally, the communications module supporting the near field communications technology is a Bluetooth BT communications module, or the communications module supporting the near field communications technology is a global positioning system GPS communications module.

With reference to any one the first aspect or the first to the eleventh possible implementations of the first aspect, in a twelfth possible implementation of the first aspect, before the determining a communication status of each of a plurality of communications modules in a terminal device, the method further includes: determining that a communications module whose communication status changes exists in the plurality of communications modules.

Optionally, the method in any of the foregoing possible implementations is periodically performed.

According to a second aspect, a terminal device is provided. The terminal device is configured to perform the method according to the first aspect or any possible implementation of the first aspect. Specifically, the terminal device includes a plurality of communications modules, a plurality of antennas, and a processor that are configured to perform the method according to the first aspect or any possible implementation of the first aspect.

According to a third method, a terminal device is provided. The terminal device includes a processor, a memory, a plurality of antennas, and a plurality of communications chips; each of the plurality of communications chips supports a communications technology; the memory, the processor, and the plurality of communications chips are connected by using a bus system; the memory is configured to store an instruction; and the processor is configured to invoke the instruction stored in the memory, so that the terminal device is enabled to perform the method according to the first aspect or any possible implementation of the first aspect.

According to a fourth aspect, a computer-readable medium is provided. The computer-readable medium is configured to store a computer program, and the computer program includes an instruction used to perform the method according to the first aspect or any possible implementation of the first aspect.

According to a fifth aspect, an antenna circuit is provided. The antenna circuit is applied to a terminal device, and the antenna circuit includes M antennas, M switching modules, N communications modules, and a switching control module. Each of the M switching modules includes a movable end and at least two non-movable ends, the movable end in the switching module is connected to one of the M antennas, each of the at least two non-movable ends in the switching module is connected to one of the N communications modules, communications modules connected to every two non-movable ends in the switching module are different, and each of the N communications modules is connected to the non-movable end of at least two of the switching modules, M is a positive integer greater than or equal to 2, and N is a positive integer greater than or equal to 2.

The switching control module is configured to: determine a communication status of each of the N communications modules, and configure an antenna for each communications module from the M antennas based on an antenna use priority of the communications module by controlling the M switching modules.

Therefore, according to the antenna circuit in this application, the antenna is configured for each communications module based on the antenna use priority of the communications module, to enable a high antenna use priority to improve scenario experience of a service user.

With reference to the fifth aspect, in a first possible implementation of the fifth aspect, a value of M is 4, and a value of N is 2.

With reference to the first possible implementation of the fifth aspect, in a second possible implementation of the fifth aspect, the N communications modules include a communications module supporting a cellular communications technology and a communications module supporting a near field communications technology.

With reference to the second possible implementation of the fifth aspect, in a third possible implementation of the fifth aspect, the communications module supporting the cellular communications technology is a Long Term Evolution LTE communications module, and the communications module supporting the near field communications technology is a WiFi communications module.

Optionally, the communications module supporting the near field communications technology is a Bluetooth BT communications module, or the communications module supporting the near field communications technology is a global positioning system GPS communications module.

With reference to any one of the first to the third possible implementations of the fifth aspect, in a fourth possible implementation of the fifth aspect, the M switching modules are single pole, double throw switches.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions in embodiments of the present invention can be applied to various communications systems such as a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, and a Universal Mobile Telecommunications System (Universal Mobile Telecommunications System, UMTS).

It should be noted that in the embodiments of the present invention, a communications module corresponds to a communications system or a communication technology. For example, the communications module in the embodiments of the present invention includes an LTE communications module. The LTE communications module supports an LTE system; in other words, the LTE communications module supports an LTE communications technology.

It should be further understood that in the embodiments of the present invention, a terminal device (Terminal Equipment) may also be referred to as user equipment (User Equipment, "UE" for short), a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (also referred to as a "cellular" phone), a computer with a mobile terminal, a portable, pocket-sized, handheld, computer built-in, or in-vehicle mobile apparatus, a terminal device in a future 5G network, or a terminal device in a future evolved public land mobile network (Public Land Mobile Network, "PLMN" for short).

Figure 1:
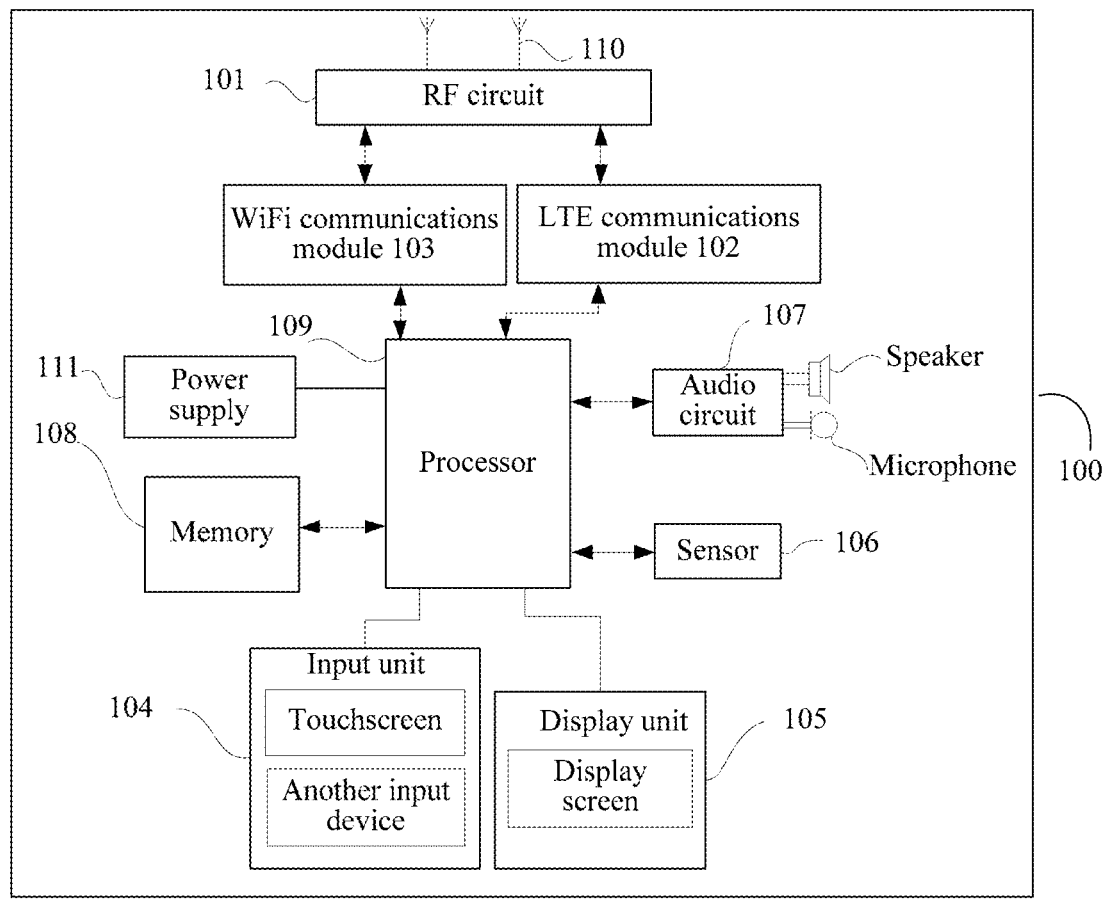
FIG. 1 is a schematic block diagram of a terminal device according to an embodiment of the present invention.

FIG. 1 is a block diagram of a partial structure of a related terminal device according to an embodiment of the present invention. Referring to FIG. 1, the terminal device 100 includes components such as a radio frequency (Radio Frequency, "RF" for short) circuit 101, an LTE communications module 102, a WiFi communications module 103, an input unit 104, a display unit 105, a sensor 106, an audio circuit 107, a memory 108, a processor 109, an antenna 110, and a power supply 111. These components communicate with each other by using one or more communications buses or signal lines. A person skilled in the art may understand that the structure of the device shown in FIG. 1 does not constitute any limitation to the terminal device, and may include more or fewer components than those shown in the figure, or some components may be combined, or a different component layout may be used.

The components of the terminal device 100 are described below in detail with reference to FIG. 1.

The RF circuit 101 may be configured to: in a data transmission process, convert an electrical signal into a radio frequency signal (such as an electromagnetic signal), and send the radio frequency signal to a wireless communications network or another communications device at a transmit power by using the antenna (Antenna) 110; otherwise, the RF circuit 101 converts a radio frequency signal received from the antenna 110 into an electrical signal, and sends the electrical signal to the LTE communications module 102 or the WiFi communications module 103 for processing. For example, when the terminal device 100 interacts with a base station, the RF circuit 101 controls the antenna 110 to receive a radio frequency signal carrying downlink data that is delivered by the base station, and transmits the radio frequency signal to the LTE communications modules 102 for processing. In addition, after receiving a radio frequency signal carrying uplink data that is sent by the LTE communications module 102, the RF circuit 101 sends the radio frequency signal to the base station by using the antenna 110. Alternatively, when the terminal device 100 interacts with an access point (Access Point, "AP" for short), the RF circuit 101 controls the antenna 110 to receive a radio frequency signal carrying downlink data that is delivered by the AP, and transmits the radio frequency signal to the LTE communications modules 103 for processing. Similarly, after receiving a radio frequency signal carrying uplink data that is sent by the LTE communications module 103, the RF circuit 101 sends the radio frequency signal to the AP by using the antenna 101. The uplink data or the downlink data includes call data, information data, mobile network data, and the like. The terminal device 100 includes at least two antennas 110. It may be understood that the terminal device 100 may further include a communications module supporting another communications technology. The LTE communications module 102 and the WiFi communications module 103 are merely examples herein.

The wireless communications network is, for example, the Internet (also referred to as the World Wide Web (World Wide Web, "WWW" for short)), an intranet, and/or a wireless network (such as a cellular phone network, a wireless local area network (Wireless Local Area Network, "WLAN" for short), and/or a metropolitan area network ((Metropolitan Area Network, "MAN" for short)). Wireless communication may use any type of various communication standards, protocols, and technologies, including but not limited to a GSM system, an enhanced data GSM environment (EDGE), High Speed Downlink Packet Access (HSDPA), High Speed Uplink Packet Access (HSUPA), WCDMA, CDMA, Time Division Multiple Access (TDMA), LTE, Bluetooth, WiFi (for example, IEEE 802.11a, IEEE 802.11b, IEEE 802.11g, and/or IEEE 802.11n), the Voice over Internet Protocol (VoIP), Wi-MAX, an email protocol (for example, the Internet Message Access Protocol (IMAP) and/or the Post Office Protocol (POP)), instant messaging (for example, the Extensible Messaging and Presence Protocol (XMPP), the SIP for Instant Messaging and Presence Leveraging Extensions (SIMPLE), an instant message and presence service (IMPS)), and/or a short message service (SMS), or any other appropriate communication protocol, including communication protocols that are not developed before the data on which the present document is filed.

The memory 108 may be configured to store a software program and a module, and the processor 109 runs the software program and the module that are stored in the memory 108, to perform various functional applications and data processing of the terminal device. The memory 108 may mainly include a program storage area and a data storage area. The program storage area may store an operating system, an application required by at least one function (such as a sound playback function and an image display function), and the like. The data storage area may store data (such as audio frequency data and an address book) created based on use of a wireless communications device, and the like. In addition, the memory 108 may include a high speed random access memory, and may further include a non-volatile memory, such as at least one magnetic disk storage device, a flash memory, or another volatile solid-state storage device.

The input unit 104 may be configured to: receive entered gesture information, digit information, or character information, and generate a key signal input related to a user setting and function control of the terminal device 100. Specifically, the input unit 104 may include a touchscreen and another input device. The touchscreen may collect a touch control operation of a user on or near the touchscreen (such as an operation of the user on or near the touchscreen by using any suitable object or accessory such as a finger or a stylus), and drive a corresponding connection apparatus based on a preset program. In addition to the touchscreen, the input unit 130 may further include another input device. Specifically, the another input device may include, but is not limited to, one or more of a physical keyboard, a functional key (such as a volume control key or a switch key), a track ball, a mouse, a joystick, and the like.

The display unit 105 may be configured to display information entered by the user or information provided to the user, and various menus of the wireless communications device. The display unit 105 may include a display screen. Optionally, the display screen may be configured by using a liquid crystal display (Liquid Crystal Display, "LCD" for short), an organic light-emitting diode (Organic Light Emitting Diode, "OLED" for short), or the like. Although in FIG. 1, the touchscreen and the display screen are used as two separate components to implement input and output functions of the wireless communications device. However, in some embodiments, the touchscreen and the display screen may be integrated to implement the input and output functions of the wireless communications device.

The terminal device 100 may further include at least one sensor 106, such as a capacitive sensor, an optical sensor, a motion sensor and other sensors. The optical sensor may include an ambient light sensor and a proximity sensor. The proximity sensor may be configured to detect whether there is an object approaching the wireless communications device. The capacitive sensor may be configured to detect whether there is an object (such as a human body or an animal) that can cause a capacitance change and that approaches the wireless communications device.

The audio circuit 107, a speaker, and a microphone may provide audio interfaces between the user and the terminal device. The audio circuit 107 may convert received audio data into an electric signal and transmit the electric signal to the speaker. The speaker converts the electric signal into a sound signal for output. On the other hand, the microphone converts a collected sound signal into an electric signal. The audio circuit 107 receives the electric signal, converts the electric signal into audio data, and then outputs the audio data to the processor 109 for processing. Then, the processor 109 sends the audio data to, for example, another wireless communications device by using the RF circuit 101, or outputs the audio data to the memory 108 for further processing.

The processor 109 is a control center of the terminal device, and is connected to various parts of the entire wireless communications device by using various interfaces and lines. By running or executing the software program and/or module stored in the memory 108, and invoking data stored in the memory 108, the processor 109 performs various functions and data processing of the wireless communications device, thereby performing overall monitoring on the wireless communications device. Optionally, the processor 109 includes an application processor (Application Processor) and a modem processor (Modem Processor). The application processor mainly processes an operating system, a user interface, an application, and the like. The modem processor mainly processes wireless communication. It may be understood that the modem processor and the modem processor may be integrated into a same processor, or may be separate processors independent of each other. The processor 109 may be a central processing unit (Central Processing Unit, "CPU" for short), or the processor 109 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor, or the like. It may be understood that the processor 109 and the memory 108 may be integrated into a same chip, or may be separate chips independent of each other.

The terminal device 100 further includes the power supply 111 (such as a battery) that supplies power to the components. Preferably, the power supply may be logically connected to the processor 109 by using a power management system, thereby implementing functions such as charging, discharging, and power consumption management by using the power management system.

Although not shown in the figure, the terminal device may further include a camera, a GPS communications module, a Bluetooth communications module, and the like, and details are not described herein.

As shown in FIG. 1, the terminal device 100 supports communications technologies such as LTE and WiFi. Therefore, the antenna 110 needs to include an antenna supporting the communications technologies such as LTE and WiFi. Currently, a multiple-input multiple-output (Multiple-Input Multiple-Output, "MIMO" for short) technology such as LTE MIMO or WiFi MIMO is usually used to improve communication quality. However, an antenna space of the terminal device 100 is limited. In the limited antenna space, LTE MIMO and WiFi MIOM cannot be both supported by setting a relatively large quantity of antennas 110.

Based on this, an embodiment of the present invention provides an antenna circuit used to configure an antenna, so that a plurality of communications module can share the antenna, and the terminal device can support MIMO transmission supporting a plurality of communications technologies, thereby improving scenario experience of a service user.

Figure 2:
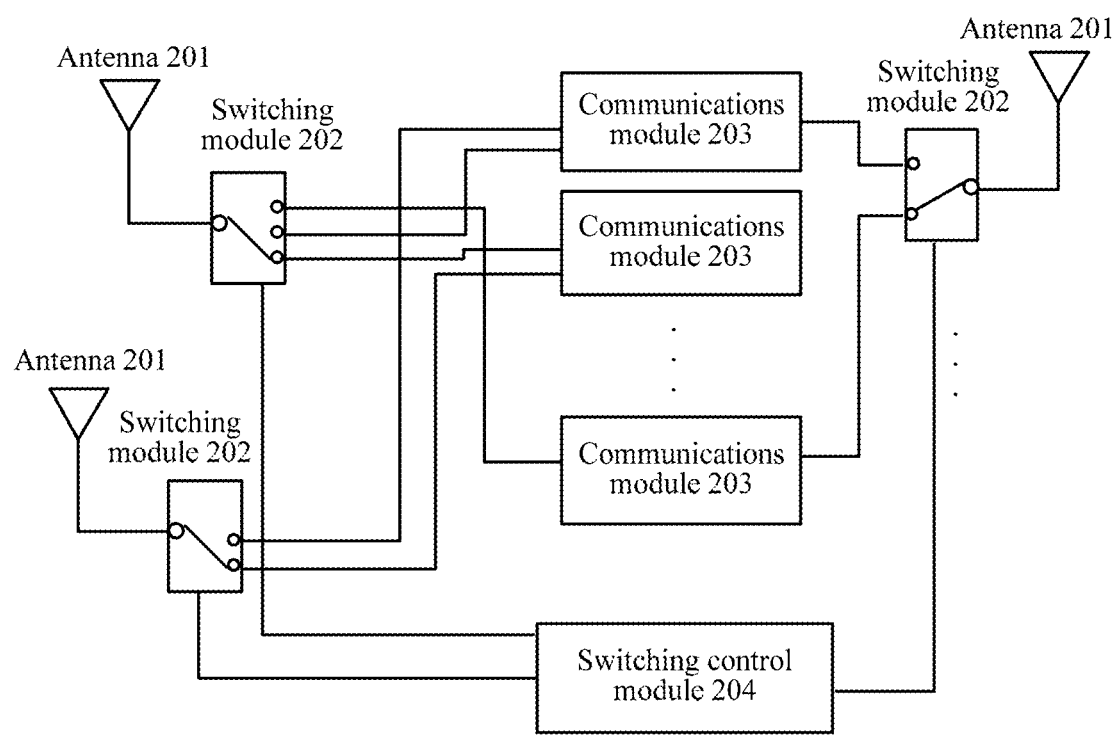
FIG. 2 is a schematic block diagram of an antenna circuit according to an embodiment of the present invention.

Specifically, FIG. 2 is a schematic block diagram of an antenna circuit according to an embodiment of the present invention. As shown in FIG. 2, the antenna circuit 200 includes M antennas 201, M switching modules 202, N communications modules 203, and a switching control module 204. Each switching module 202 includes a movable end and at least two non-movable ends. The movable end in the switching module 202 is connected to one of the M antennas 201. Each of the at least two non-movable ends in the switching module 202 is connected to one of the N communications modules 203, and communications modules connected to every two non-movable ends in the switching module 202 are different. The switching control module 204 may be disposed in the processor 109, or may be disposed in another communications chip such as an LTE communications chip.

Each communications module 203 is connected to the non-movable end of at least two switching modules 202, M is a positive integer greater than or equal to 2, and N is a positive integer greater than or equal to 2.

The switching control module 204 is configured to: when a plurality of communications modules 203 simultaneously work, determine communication statuses of the plurality of communications modules 203, determine an antenna use priority of each communications module 203 based on the communication statuses of the plurality of communications modules 203, and configure an antenna for each communications module 203 from the M antennas 201 based on the antenna use priority of the communications module 203 by controlling the switching module 202 connected to the communications module 203.

It may be understood that, the switching module 202 is configured to control the antenna connected to the movable end in the switching module 202 to switch between the communications modules 203 connected to the non-movable ends in the switching module 202.

Optionally, in an example, the N communications modules include a communications module supporting a cellular communications technology and a communications module supporting a near field communications technology. The near field communications technology includes but is not limited to WiFi, Bluetooth, a GPS, and the like.

Optionally, in an example, the communications module supporting the cellular communications technology is an LTE communications module, and the communications module supporting the near field communications technology is a WiFi communications module.

In the foregoing embodiment, the switching module may be a single-pole multi-throw switch, or may be another circuit component that can implement switching between different communications modules. In addition, based on different quantities of communications modules, the switching module correspondingly changes. For example, when the terminal device includes three communications modules, one antenna may be electrically connected to the three communications modules by using a single-pole three-throw switch. A specific type of the switching module is not limited in this application.

Figure 3:
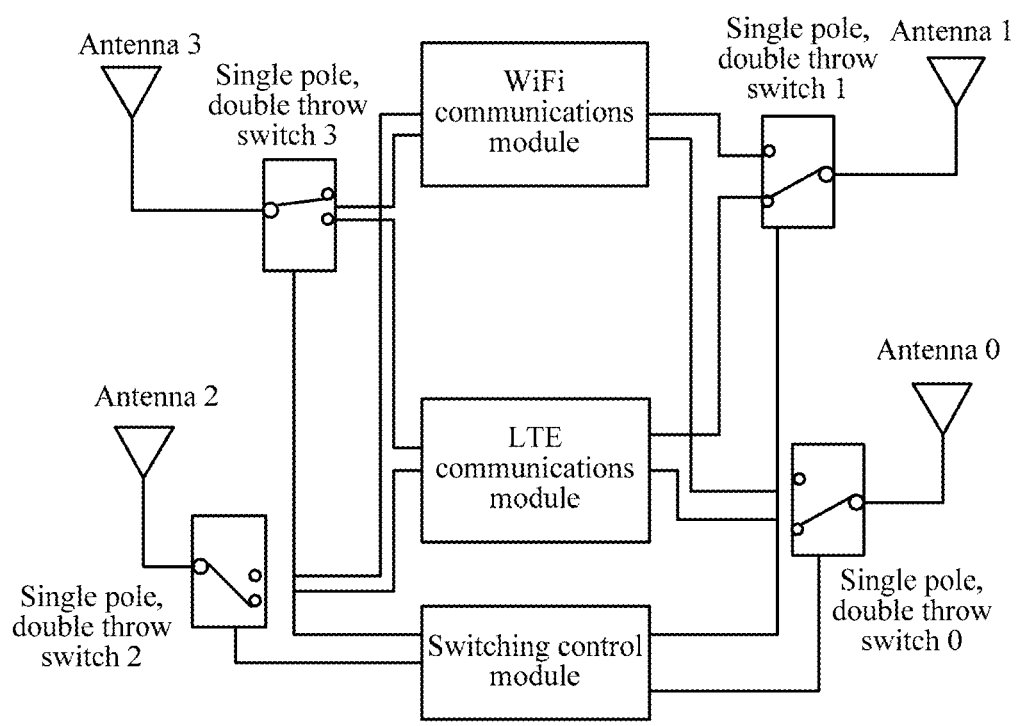
FIG. 3 is a schematic block diagram of an antenna circuit according to a specific embodiment of the present invention.

FIG. 3 is a schematic diagram of an antenna circuit according to a specific embodiment of the present invention. As shown in FIG. 3, a terminal device includes four antennas, which are respectively marked as an antenna 0, an antenna 1, an antenna 2, and an antenna 3. Each antenna is connected to a WiFi communications module or an LTE communications module in the terminal device by using a single pole, double throw switch. In a communication process, the antenna is considered as a resource that can be dynamically scheduled, and a switching control module determines an antenna use priority of each communications module (the LTE communications module and the WiFi communications module) based on a communication status of the communications module, and configure an antenna for each communications module based on the determined antenna use priority. For example, as shown in FIG. 3, antennas 0 to 2 are configured for the LTE communications module, and the antenna 3 is configured for the WiFi communications module.

An antenna configuration method according to an embodiment of the present invention is described below in detail by using an example in which a terminal device 100 includes four antennas and the antenna circuit shown in FIG. 3. It should be noted that in descriptions of the embodiments, "first", "second", and the like are merely for distinguishing described objects rather than constituting any limitation to the described objects.

Figure 4:
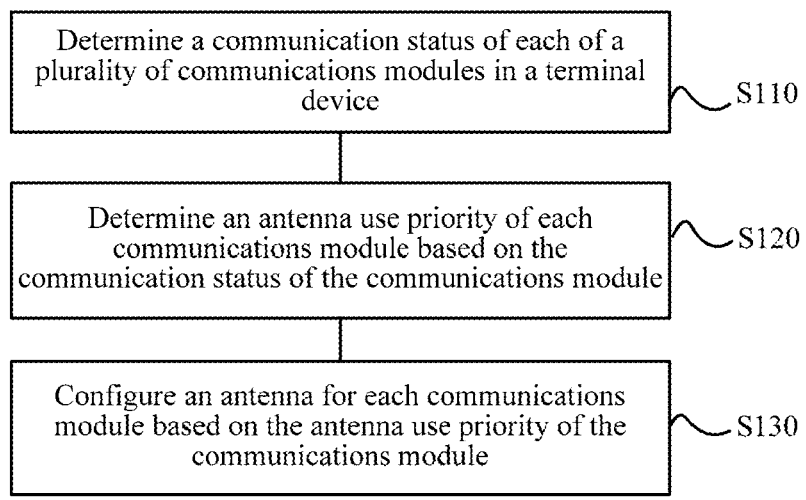
FIG. 4 is a schematic flowchart of an antenna configuration method according to an embodiment of the present invention.

FIG. 4 is an antenna configuration method according to an embodiment of the present invention. The method is performed by the switching control module 204 in FIG. 2, and the switching control module 204 may be disposed in the processor 109 or may be disposed in another communications chip. For example, the switching control module 204 in this embodiment is built in the processor 109. As shown in FIG. 4, the method 100 includes the following steps.

S110: Determine a communication status of each of a plurality of communications modules in a terminal device.

Optionally, the communication status of the communications module includes one or more of the following aspects: (1) A signal status of a wireless communications network corresponding to the communications module. For example, weak receiving, weak transmitting, strong receiving, or strong transmitting. Without loss of generality, the signal status of the wireless communications network may be indicated by using the following signal parameters: a received signal strength indicator (Received Signal Strength Indicator, "RSSI" for short), a received signal code power (Received Signal Code Power, "RSCP" for short), a reference signal received power (Reference Signal Receiving Power, "RSRP" for short), a signal to interference plus noise ratio (Signal to Interference Plus Noise Ratio, "SINR" for short), or a block error rate (Block Error Ratio, "BLEW" for short). (2) A service status of the communications module, for example, a data service, a voice service, or an idle state. (3) A data type, such as a streaming (Streaming) type or a browsing (Browsing) type, of a data service performed by the communications module.

Specifically, when the LTE communications module 102 and the WiFi communications module 103 in the terminal device simultaneously work, the LTE communications module 102 may report a signal status and a service status to the processor 109 by directly using an access transfer (Access Transfer, "AT" for short) channel, and the WiFi communications module 103 may report a signal status and a service status to the processor 109 by directly using a Peripheral Component Interconnect Express (Peripheral Component Interconnect Express, "PCIe" for short) channel. Alternatively, the processor 109 sends, to the LTE communications module 102 by using the AT channel, a triggering signal that triggers the LTE communications module 102 to report a signal status and a service status, and then the LTE communications module 102 reports the signal status and the service status to the processor 109 by using the AT channel.

The processor 109 sends, to the WiFi communications module 103 by using the PCIe channel, a triggering signal that triggers the WiFi communications module 103 to report a signal status and a service status, and then the WiFi communications module 103 reports the service status and the service status to the processor 109 by using the PCIe channel. The processor 109 may directly obtain a data type of a data service performed by the LTE communications module 102 or the WiFi communications module 103 from a framework (Framework) layer of an operating system stored in the memory 108.

S120: Determine an antenna use priority of each communications module based on the communication status of the communications module.

Optionally, the processor 109 determines the antenna use priority of each communications module based on the communication status and a preset correspondence. The preset correspondence includes a correspondence between the communication status and the antenna use priority. Alternatively, it may be understood that, the correspondence between the communication status and the antenna use priority is preset in the memory 108. After determining the communication status of each communications module, the processor 109 determines, by querying the preset correspondence, the antenna use priority corresponding to the communications module. For example, the terminal device 100 includes the LTE communications module 102 and the WiFi communications module 103, and the preset correspondence between the communication status and the antenna use priority is: When the communication status is that the LTE communications module 102 performs a voice service, the LTE communications module 102 has a high antenna use priority; and when the WiFi communications module 103 is in an idle state, the WiFi communications module 103 has a low antenna use priority. Therefore, when the processor 109 determines that the communication status of the LTE communications module 103 is performing the voice service, and the communication status of the WiFi communications module is in the idle state, it may be determined that the LTE communications module 102 has the high antenna use priority, and the WiFi communications module 103 has the low antenna use priority.

Optionally, in an example, when the antenna use priority of each communications module is determined, a definition objective of the antenna use priority is giving a relatively high antenna use priority to a communications module corresponding to a service having a relatively high antenna performance requirement, and giving a relatively low antenna use priority to a communications module corresponding to a service having a relatively low antenna performance requirement. Therefore, user experience of a service having a relatively high antenna performance requirement is improved, and normal execution of a service having a relatively low antenna performance requirement is ensured.

For example, a communications module whose communication status is performing a data service or a voice service is defined to have a relatively high antenna use priority, and a communications module whose communication status is idle is defined to have a relatively low antenna use priority. A communications module whose communication status is performing weak receiving/weak transmitting is defined to have a relatively high antenna use priority, and a communications module whose communication status is performing strong receiving/strong transmitting is defined to have a relatively low antenna use priority. A communications module whose communication status is performing a data service, where a data type of the data service is a continuous high speed transmission type such as a streaming type, is defined to have a relatively high antenna use priority. A communications module whose communication status is performing a data service, where a data type of the data service is a discontinuous low speed transmission type such as a browsing type, is defined to have a relatively low antenna use priority.

For example, the antenna use priority may be divided into four levels, which are respectively a highest antenna use priority, a high antenna use priority, a middle antenna use priority, and a low antenna use priority. Specifically, a communications module whose communication status is performing a high speed data transmission service in a signal weak field is defined to have the highest antenna use priority, and the high speed data transmission service may be, for example, a high-definition video or heavy traffic downloading; or a communications module whose communication status is performing a voice service in a signal weak field is defined to have the highest antenna use priority, and the voice service may be, for example, VoLTE, VoWiFi, or a WeChat video; or a communications module whose communication status is using an application (Application, "APP" for short) for which a user is relatively sensitive to frame freezing in a signal weak field is defined to have the highest antenna use priority, and the APP for which a user is relatively sensitive to frame freezing may be, for example, taxi hailing software. A communications module whose communication status is performing a high speed data transmission service in a signal strong field is defined to have the high antenna use priority; or a communications module whose communication status is performing a voice service in a signal strong field is defined to have the high antenna use priority; or a communications module whose communication status is using an APP for which a user is relatively sensitive to frame freezing in a signal strong field is defined to have the high antenna use priority. A communications module whose communication status is performing a low speed data transmission service is defined to have the middle antenna use priority. A communications module whose communication status is an idle state and requiring basic connection maintenance is determined to have the low antenna use priority.

S130: Configure an antenna for each communications module based on the antenna use priority of the communications module.

The processor 109 configures antennas based on antenna use priorities of the LTE communications module 102 and the WiFi communications module 103. The processor 109 notifies the LTE communications module 102 of an antenna configuration result by using the AT channel, and notifies the WiFi communications module 103 of an antenna configuration result by using the PCIe channel.

Then, the LTE communications module 102 and the WiFi communications module 103 perform antenna algorithm adjustment based on a quantity of configured antennas. For example, if a quantity of antennas currently configured for the LTE communications module 102 is 4, and a quantity of antennas configured for the WiFi communications module 103 is 0, the LTE communications module 102 may use a four-antenna algorithm. Assuming that in an antenna reconfiguration process, a quantity of antennas configured for the LTE communications module 102 is 2, and a quantity of antennas configured for the WiFi communications module 103 is 2, the LTE communications module 102 needs to roll back the four-antenna algorithm to a two-antenna algorithm, and the WiFi communications module 103 may use the two-antenna algorithm. For the LTE communications module 102 and the WiFi communications module 103, quantities of configured antennas and executable antenna algorithms are shown in Table 1. In Table 1, m+n indicates that a quantity of antennas configured for the LTE communications module 102 is m, and a quantity of antennas configured for the WiFi communications module 103 is n.

TABLE 1

|  | 4 + 0 | 3 + 1 | 2 + 2 | 1 + 3 | 0 + 4 |
|---|---|---|---|---|---|
| LTE Multiple-antenna algorithm | 4/3/2/1 Layer MIMO | 3/2/1 Layer MIMO | 2/1 Layer MIMO | 1 Layer SISO | Off |
| WiFi Multiple-antenna algorithm | Off | 1 Layer SISO | 2/1 Layer MIMO | 3/2/1 Layer MIMO | 4/3/2/1 Layer MIMO |

Figure 5:
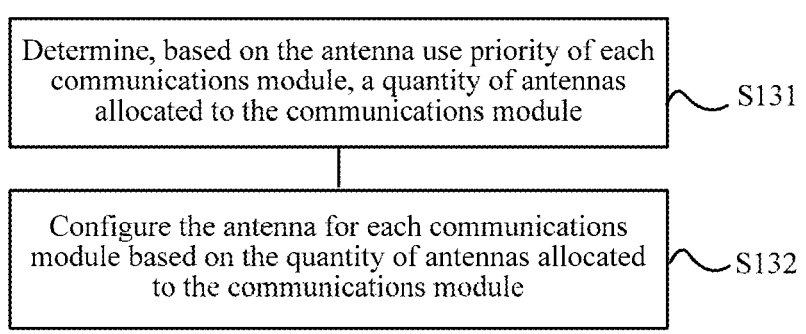
FIG. 5 is another schematic flowchart of an antenna configuration method according to an embodiment of the present invention.

In this embodiment of the present invention, optionally, as shown in FIG. 5, S130 includes:

S131: Determine, based on the antenna use priority of each communications module, a quantity of antennas allocated to the communications module.

S132: Configure the antenna for each communications module based on the quantity of antennas allocated to the communications module.

Optionally, in S131, the determining, based on the antenna use priority of each communications module, a quantity of antennas allocated to the communications module is specifically: determining, based on the antenna use priority of each communications module, a maximum quantity of antennas supported by the communications module, and an antenna quantity allocation principle for the communications module, the quantity of antennas allocated to the communications module.

Optionally, in an example, the antenna quantity allocation principle is: A quantity of antennas allocated to a communications module having the highest priority is the maximum quantity of antennas supported by the communications module. If there is one or more remaining antennas, a quantity of antennas allocated to a communications module having the high priority is the maximum quantity of antennas supported by the communications module. The rest can be deduced by analogy until all antennas are allocated or each communications module is allocated the maximum quantity of antennas supported by the communications module.

For example, it is assumed that the LTE communications module 102 has the highest antenna use priority, and the WiFi communications module 103 has the high antenna use priority. A maximum quantity of antennas supported by the LTE communications module 102 is 2, and a maximum quantity of antennas supported by the WiFi communications module 103 is 1. The terminal device 100 includes four antennas 110. Therefore, during antenna quantity allocation, the processor 109 allocates two antennas to the LTE communications module 102. In this case, there are two remaining antennas, so that one antenna is allocated to the WiFi communications module 103. Then, there is one remaining antenna. Both the LTE communications module 102 and the WiFi communications module 103 are allocated the maximum quantity of antennas supported by the LTE communications module 102 and the maximum quantity of antennas supported by the WiFi communications module 103. Therefore, the antenna quantity allocation is complete.

Alternatively, it is assumed that the LTE communications module 102 has the highest antenna use priority, and the WiFi communications module 103 has the high antenna use priority. A maximum quantity of antennas supported by the LTE communications module 102 is 3, and a maximum quantity of antennas supported by the WiFi communications module 103 is 2. The terminal device 100 includes four antennas 110. Therefore, during antenna quantity allocation, the processor 109 allocates three antennas to the LTE communications module 102. In this case, there is one remaining antenna, so that one antenna is allocated to the WiFi communications module 103. Therefore, the antenna quantity allocation is complete.

Figure 6:
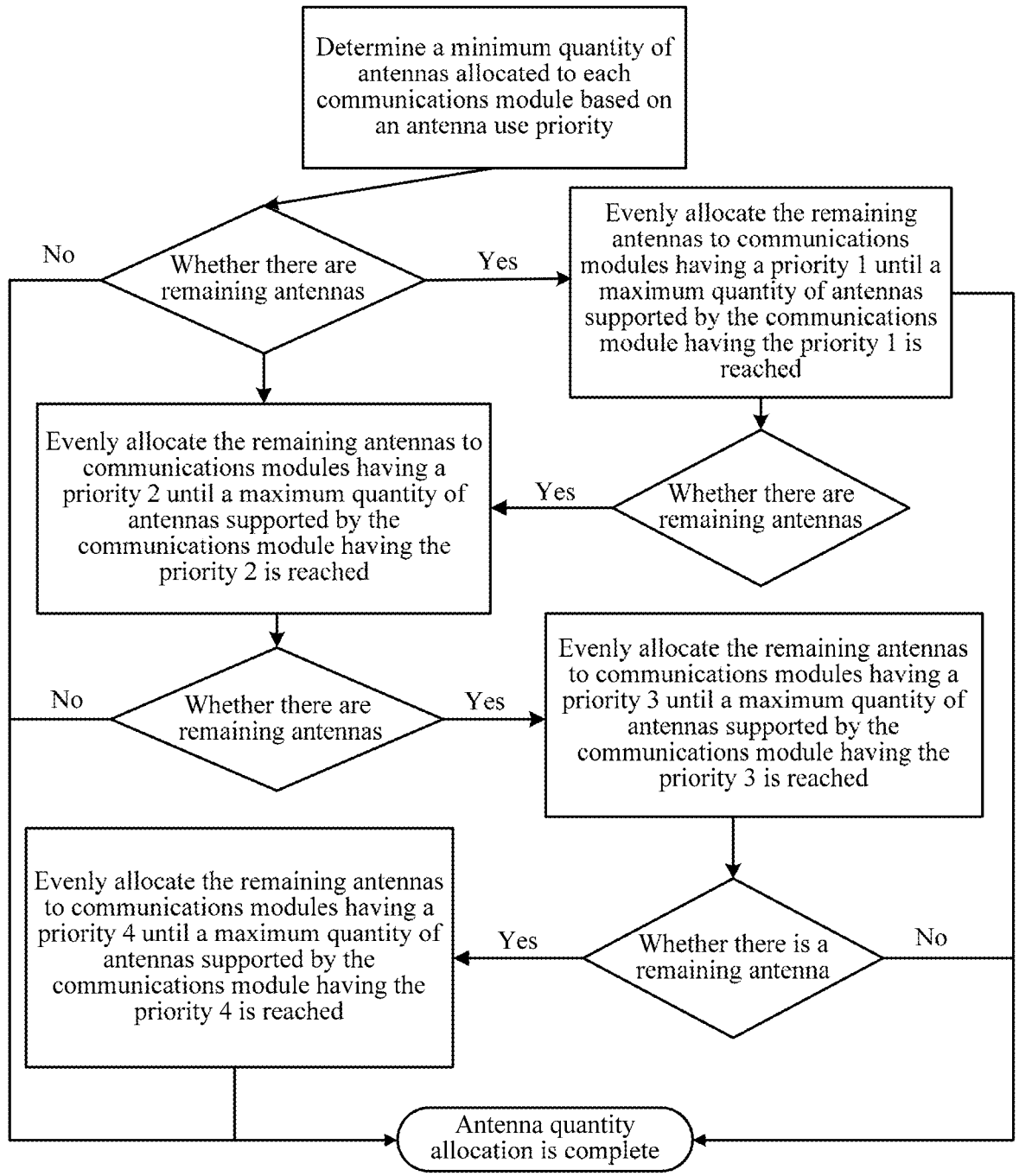
FIG. 6 is a schematic flowchart of a method for allocating a quantity of antennas to each communications module according to an embodiment of the present invention.

Optionally, in another example, the antenna quantity allocation principle is shown in FIG. 6. In FIG. 6, for ease of description, the highest antenna use priority is described as a "priority 1", the high antenna use priority is described as a "priority 2", the middle antenna use priority is described as a "priority 3", and a low antenna use priority is described as a "priority 4".

During antenna quantity allocation, the processor 109 first determines, based on the antenna use priority of each communications module, a minimum quantity of antennas allocated to the communications module. Specifically, a correspondence between the antenna use priority and the minimum quantity of antennas may be prestored in the memory 108, so that the processor 109 can determine, based on the antenna use priority of the communications module and the correspondence, the minimum quantity of antennas allocated to the communications module. Then, the processor 109 evenly allocates remaining antennas to each communications module having the priority 1. When a quantity of antennas allocated to the communications module having the priority 1 reaches the maximum quantity of antennas supported by the communications module and there are remaining antennas, the remaining antennas are evenly allocated to each communications module having the priority 2. When a quantity of antennas allocated to the communications module having the priority 2 reaches the maximum quantity of antennas supported by the communications module and there is a remaining antenna, antenna quantity allocation is performed in the foregoing manner until there is no remaining antenna and a quantity of antennas allocated to each communications module reaches the maximum quantity of antennas supported by the communications module. Therefore, the antenna quantity allocation is complete.

For example, it is assumed that a minimum quantity of antennas corresponding to the low antenna use priority is 0, a minimum quantity of antennas corresponding to the middle antenna use priority is 1, and a minimum quantity of antennas corresponding to the highest/high antenna use priority is 2. Table 2 shows a case in which when a maximum quantity of antennas supported by the LTE communications module 102 is 4, a maximum quantity of antennas supported by the WiFi communications module 103 is 2, and the LTE communications module 102 and the WiFi communications module 103 correspond to different antenna use priorities, quantities of antennas that can be respectively allocated to the LTE communications module 102 and the WiFi communications module 103. For example, as shown in Table 2, if the LTE communications module 102 corresponds to the highest antenna use priority, and the WiFi communications module 103 corresponds to the middle antenna use priority, the processor 109 determines that a minimum quantity of antennas allocated to the LTE communications module 102 is 2, a minimum quantity of antennas allocated to the WiFi communications module 103 is 1, and there is one remaining antenna. The antenna use priority of the LTE communications module 102 is higher than the antenna use priority of the WiFi communications module 103. Therefore, the processor 109 allocates the remaining antenna to the LTE communications module 102. Finally, the quantity of antennas that can be allocated to the LTE communications module 102 is 3, and the quantity of antennas that can be allocated to the WiFi communications module 103 is 1.

TABLE 2

| | | WiFi communications module (a maximum quantity of supported antennas is 2) | | | |
|---|---|---|---|---|---|
| | | Highest antenna use priority | High antenna use priority | Middle antenna use priority | Low antenna use priority |
| LTE communications module (a maximum quantity of supported antennas is 4) | Highest antenna use priority | 2 + 2 | 2 + 2 | 3 + 1 | 4 + 0 |
| | High antenna use priority | 2 + 2 | 2 + 2 | 3 + 1 | 4 + 0 |
| | Middle antenna use priority | 2 + 2 | 2 + 2 | 2 + 2 | 4 + 0 |
| | Low antenna use priority | 2 + 2 | 2 + 2 | 2 + 2 | 2 + 2 |

Table 3 shows a case in which when a maximum quantity of antennas supported by the LTE communications module 102 is 4, a maximum quantity of antennas supported by the WiFi communications module 103 is 4, quantities of antennas that can be respectively allocated to the LTE communications module 102 and the WiFi communications module 103. As shown in Table 3, if the LTE communications module 102 corresponds to the middle antenna use priority, and the WiFi communications module 103 corresponds to the highest antenna use priority, the processor 109 determines that a minimum quantity of antennas allocated to the LTE communications module 102 is 1, a minimum quantity of antennas allocated to the WiFi communications module 103 is 2, and there is one remaining antenna. The antenna use priority of the WiFi communications module 103 is higher than the antenna use priority of the LTE communications module 102. Therefore, the remaining antenna is allocated to the WiFi communications module 103. Finally, the quantity of antennas that can be allocated to the LTE communications module 102 is 1, and the quantity of antennas that can be allocated to the WiFi communications module 103 is 3.

maximum quantity of antennas supported by the communications module is determined as the minimum quantity of antennas corresponding to the antenna use priority of the communications module.

In this embodiment of the present invention, optionally, before the processor 109 determines the communication status of each of the plurality of communications modules, the processor 109 is further configured to determine a status of the terminal device. When configuring the antenna for each communications module based on the antenna use priority of the communications module, the processor 109 specifically configures the antenna for each communications module based on the antenna use priority of the communications module and the status of the terminal device.

Optionally, the status of the terminal device includes but is not limited to a battery level status of the terminal device and a screen status of the terminal device.

For example, when the processor 109 detects that the touchscreen of the terminal device 100 is enabled, and an application (Application, "APP" for short) currently used by a service user is WeChat (WeChat), to ensure Wechat use experience of the service user, the processor 109 determines

TABLE 3

| | | WiFi communications module (a maximum quantity of supported antennas is 4) | | | |
|---|---|---|---|---|---|
| | | Highest antenna use priority | High antenna use priority | Middle antenna use priority | Low antenna use priority |
| LTE communications module (a maximum quantity of supported antennas is 4) | Highest antenna use priority | 2 + 2 | 2 + 2 | 3 + 1 | 4 + 0 |
| | High antenna use priority | 2 + 2 | 2 + 2 | 3 + 1 | 4 + 0 |
| | Middle antenna use priority | 1 + 3 | 1 + 3 | 2 + 2 | 4 + 0 |
| | Low antenna use priority | 0 + 4 | 0 + 4 | 0 + 4 | 2 + 2 |

It should be noted that x+y in Table 2 and Table 3 indicates that the quantity of antennas allocated to the LTE communications module 102 is x, and the quantity of antennas allocated to the WiFi communications module 103 is y.

In the foregoing embodiments, if a minimum quantity of antennas corresponding to an antenna use priority of a communications module is greater than a maximum quantity of antennas supported by the communications module, the that a communications module corresponding to WeChat, for example, the LTE communications module 102, has a relatively high antenna use priority, so that the processor 109 allocates a relatively large quantity of antennas to the LTE communications module 102. Therefore, a communication capability and communication quality of the LTE communications module 102 are ensured, and scenario experience of the service user is improved.

Alternatively, when the processor 109 detects that the battery 111 of the terminal device 100 is in a low battery level state, in a scenario in which the LTE communications module 102 corresponds to the middle antenna use priority, and the WiFi communications module 103 corresponds to the high antenna use priority in Table 3, the processor 109 allocates only one antenna to the LTE communications module 102, and allocates one antenna to the WiFi communications module 103. Therefore, power consumption of the terminal device 100 is reduced.

Further, when configuring the antenna for each communications module, the processor 109 further considers a maximum quantity of antennas supported by a network device corresponding to the communications module. Optionally, the network device may add information indicating the maximum quantity of antennas supported by the network device to a broadcast message, and the terminal device 100 determines, based on the information in the broadcast message, the maximum quantity of antennas supported by the network device. The broadcast message is not limited in this embodiment of the present invention.

Using the case in which the LTE communications module 102 has the highest antenna use priority and the WiFi communications module 103 has the middle antenna use priority in Table 2 as an example, if a maximum quantity of antennas supported by a network device (such as a base station) corresponding to the LTE communications module 102 is 2, when performing antenna configuration, the processor 109 configures two antennas for the LTE communications module 102, and configures one antenna for the WiFi communications module 103.

Further, in this embodiment of the present invention, before the processor 109 performs the antenna configuration, each communications module may be connected to each antenna. Performance evaluation is performed on each antenna by measuring the antenna, and a performance evaluation result is sent to the processor 109. For example, the communications module may evaluate antenna performance by using parameters such as quality of a received signal, a strength of the received signal, a bit error rate of the received signal, and quality of a transmitted signal, sort antenna performance after the evaluation, and report a sorting result to the processor 109. Alternatively, the communications module directly reports a parameter measurement result to the processor 109, and the processor 109 sorts antenna performance. It may be understood that, for different communications modules, antenna performance of different antennas may be different. Therefore, antenna performance may be sorted for each communications module. Then, when configuring the antenna for each communications module, the processor 109 starts the configuration from an antenna with relatively good antenna performance.

Optionally, in an example, the processor 109 specifically configures the antenna for each communications module based on the antenna use priority of the communications module, the quantity of antennas allocated to the communications module, and an antenna performance measurement result and an antenna selection principle for the communications module.

Figure 7:
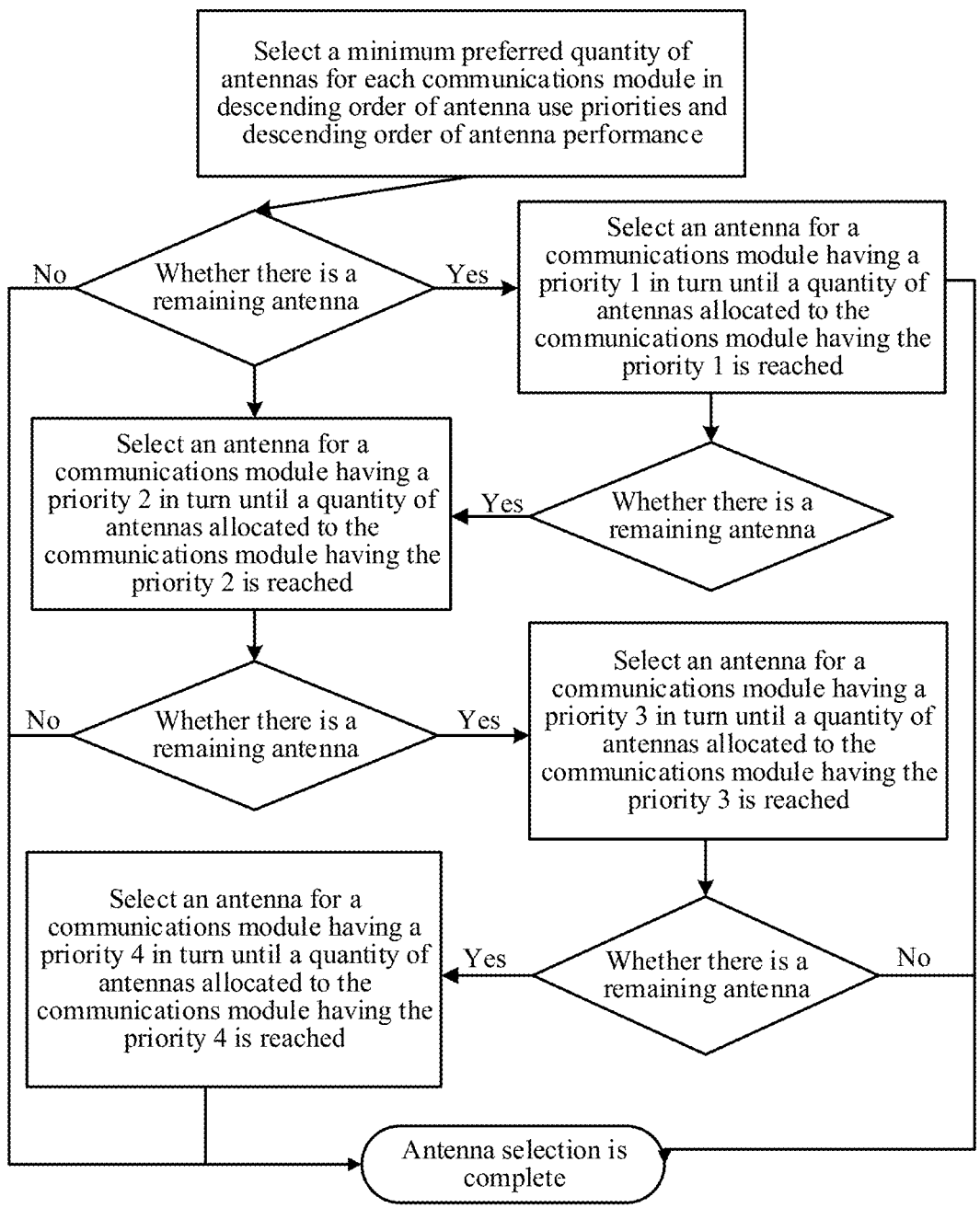
FIG. 7 is a schematic flowchart of a method for selecting an antenna for each communications module according to an embodiment of the present invention.

Optionally, in an example, the antenna selection principle is shown in FIG. 7. In FIG. 7, for ease of description, the highest antenna use priority is described as a "priority 1", the high antenna use priority is described as a "priority 2", the middle antenna use priority is described as a "priority 3", and a low antenna use priority is described as a "priority 4".

During antenna selection for each communications module, the processor 109 first selects a minimum preferred quantity of antennas for the communications module in descending order of the antenna use priorities and descending order of antenna performance. Then, an antenna is selected for each communications module having the priority 1 from one or more remaining antennas in an alternate manner. When a quantity of antennas selected for each communications module having the priority 1 reaches the quantity of antennas allocated to the communications module, an antenna is selected for each communications module having the priority 2 from one or more remaining antennas. When a quantity of antennas selected for each communications module having the priority 2 reaches the quantity of antennas allocated to the communications module and there is a remaining antenna, an antenna is selected for the communications module having a relatively low priority (the priority 3 and the priority 4) in the foregoing manner until all antennas are selected.

Optionally, when the minimum preferred quantity of antennas is selected for each communications module, the selection is performed in an order of the antenna use priorities. If a plurality of communications modules has a same priority, an antenna is selected for each communications modules in an alternate selection manner.

For example, it is assumed that the terminal device 100 further includes a Bluetooth communications module, and four antennas 110 (where numbers corresponding to the antennas are 0 to 3) are set in the terminal device 100. The LTE communications module 102 has the high antenna use priority, the WiFi communications module 103 has the middle antenna use priority, and the Bluetooth communications module has the low antenna use priority. Descending order of antenna performance that is determined by the LTE communications module 102 is 0, 1, 2, and 3, descending order of antenna performance that is determined by the WiFi communications module 103 is 1, 2, 3, and 0, and descending order of antenna performance that is determined by the Bluetooth communications module is 2, 3, 0, and 1. The processor 109 determines that a quantity of antennas allocated to the LTE communications module 102 is 2, a quantity of antennas allocated to the WiFi communications module 103 is 1, and a quantity of antennas allocated to the Bluetooth communications module is 1. It is assumed that a minimum preferred quantity of antennas corresponding to the high antenna use priority is 2, a minimum preferred quantity of antennas corresponding to the middle priority is 1, and a minimum preferred quantity of antennas corresponding to the low antenna use priority is 0. In an antenna configuration process, the processor 109 first configures antennas whose numbers are 0 and 1 for the LTE communications module 102, and then configures the antenna whose number is 2 for the WiFi communications module 103. In this case, there is one remaining antenna, a quantity of antennas configured for the LTE communications module 102 has reached the quantity of antennas allocated to the LTE communications module 102, and a quantity of antennas configured for the WiFi communications module 103 has reached the quantity of antennas allocated to the WiFi communications module 103. Therefore, the processor 109 configures the remaining antenna for the Bluetooth communications module, to be specific, configures an antenna whose number is 3 for the Bluetooth communications module.

Figure 8A:
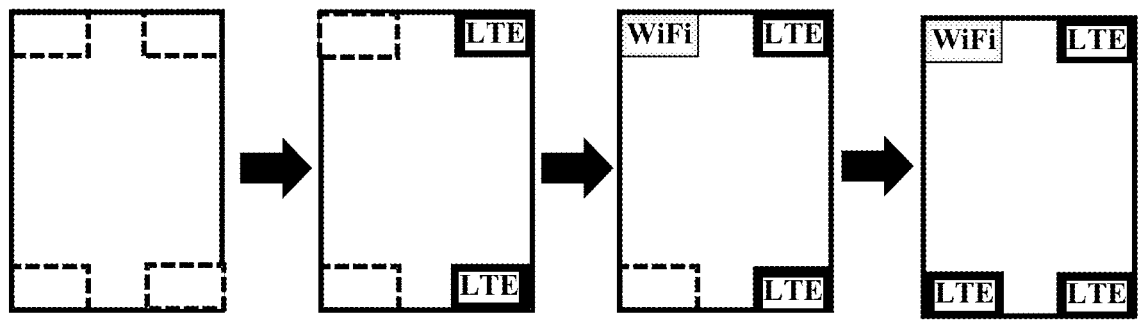
FIG. 8(a) and FIG. 8(b) are each a schematic flowchart of a method for selecting an antenna for each communications module according to another embodiment of the present invention.
Figure 8B:
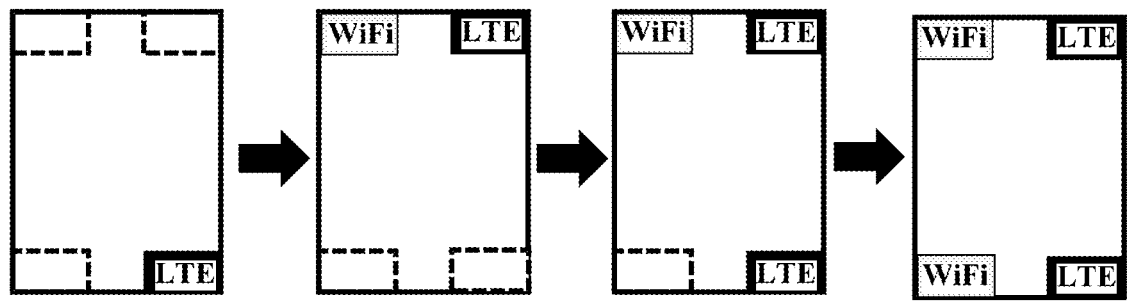

Each of FIG. 8(a) and FIG. 8(b) shows an antenna selection method according to a specific embodiment of the present invention. As shown in FIG. 8(a), it is assumed that the LTE communications module 102 corresponds to the high antenna use priority, and the WiFi communications module 103 corresponds to the middle antenna use priority. It can be learned based on a result shown in Table 2 that, a quantity of antennas allocated by the processor 109 to the LTE communications module is 3, and a quantity of antennas allocated by the processor 109 to the WiFi communications module 103 is 1. It is assumed that a minimum preferred quantity of antennas corresponding to the low antenna use priority is 0, a minimum preferred quantity of antennas corresponding to the middle antenna use priority is 1, and a minimum preferred quantity of antennas corresponding to the highest/high antenna use priority is 2. Therefore, as shown in FIG. 8 (*a*), the processor 109 preferentially selects two antennas for the LTE communications module 102, and then selects one antenna for the WiFi communications module 103. There is one remaining antenna. The antenna use priority of the LTE communications module 102 is higher than the antenna use priority of the WiFi communications module 103. Therefore, the processor 109 allocates the remaining antenna to the LTE communications module 103.

Alternatively, it is assumed that the LTE communications module 102 corresponds to the high antenna use priority, and the WiFi communications module 103 corresponds to the high antenna use priority. It can be learned based on the result shown in Table 2 that, a quantity of antennas allocated by the processor 109 to the LTE communications module 102 is 2, and a quantity of antennas allocated by the processor 109 to the WiFi communications module 103 is 2. It is assumed that a minimum preferred quantity of antennas corresponding to the low antenna use priority is 0, a minimum preferred quantity of antennas corresponding to the middle antenna use priority is 1, and a minimum preferred quantity of antennas corresponding to the highest/high antenna use priority is 2. Therefore, the processor 109 selects antennas for the LTE communications module 102 and the WiFi communications module 103 in an alternate selection manner shown in FIG. 8 (*b*).

Figure 9:
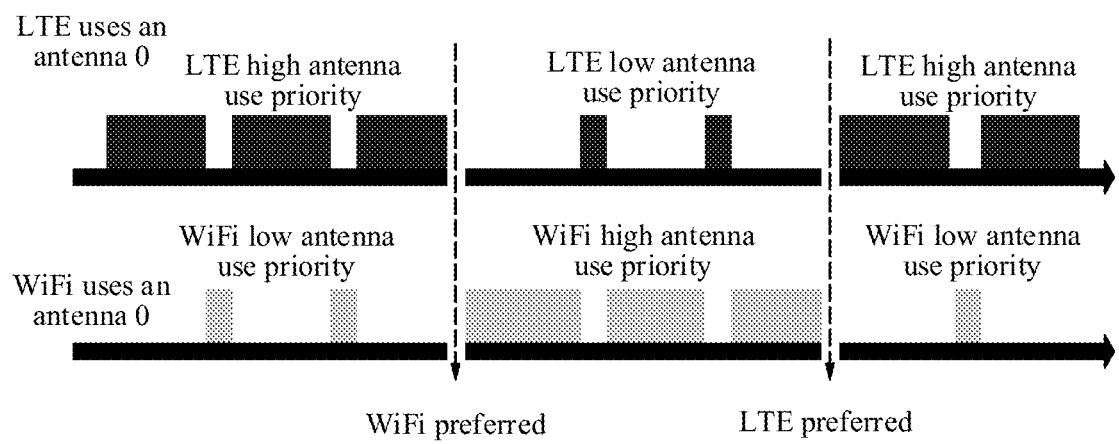
FIG. 9 is a schematic diagram in which a communications module having a high antenna use priority standard and a communications module having a low antenna use priority share an antenna according to an embodiment of the present invention.

In this embodiment of the present invention, optionally, antenna allocation is performed in a long time (a second-level to a minute-level)-fixed use scenario, each communications module has the highest priority of use on an antenna allocated to the communications module. On such a basis, the communications modules can share a plurality of antennas (a millisecond-level sharing mechanism). A principle thereof is that when a communications module having the high antenna use priority does not use, within a short time, an antenna configured for the communications module, the antenna configured for the communications module is lent to another communications module having the low antenna use priority for use. Once the communications module having the high antenna use priority needs to use the antenna configured for the communications module, the antenna is immediately returned to the communications module having the high antenna use priority for use. As shown in FIG. 9, an antenna 0 is an antenna configured for the LTE communications module 102. However, when the LTE communications module 102 has the low antenna use priority and does not need to use the antenna 0 temporarily, the processor 109 may configure the antenna 0 for the WiFi communications module 103 for use. When the LTE communications module has the high antenna use priority and needs to use the antenna 0, the antenna 0 is preferentially reconfigured for the LTE communications module. Therefore, antenna use efficiency can be improved without reducing antenna use performance of the communications module having the high antenna use priority.

In this embodiment of the present invention, optionally, the processor 109 periodically triggers each communications module to report the current communication status or periodically determines the status of the terminal device 100. When the processor 109 determines that a communication status of a communications module changes, or the status of the terminal device 100 changes (for example, the battery level status changes), the processor 109 reconfigures an antenna for each communications module according to the antenna configuration method described in the foregoing embodiments.

In this embodiment of the present invention, optionally, when a status of the touchscreen of the terminal device 100 changes, the touchscreen reports status change information to the processor 109. The processor 109 configures an antenna for each communications module in the terminal device 100 based on the status change information reported by the touchscreen and an APP used by a current service user.

Alternatively, when a communication status of a communications module in the terminal device 100 changes, the communications module reports status change information to the processor 109. The processor 109 determines, based on the status change information reported by the communications module, that the communication status of the communications module changes. In this case, the processor 109 configures an antenna for each communications module in the terminal device 100 according to the antenna configuration method described in the foregoing embodiments.

Figure 10:
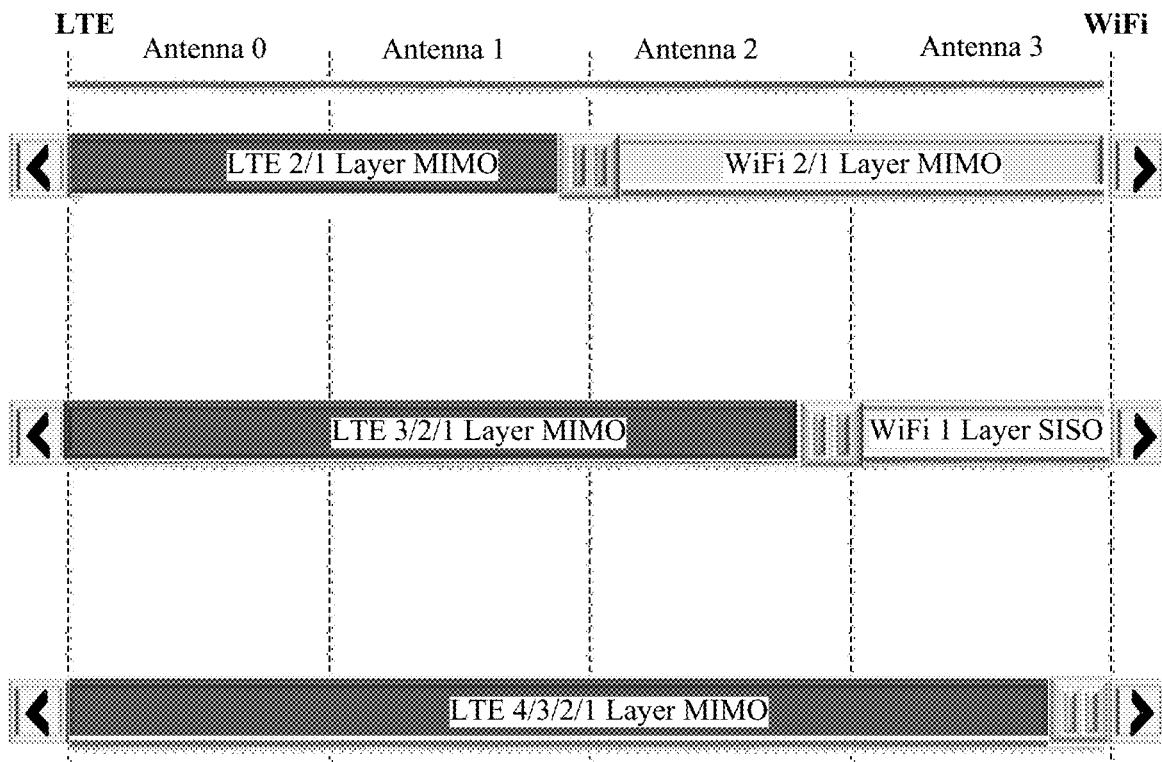
FIG. 10 is a schematic diagram of a method for allocating an antenna to each communications module according to a specific embodiment of the present invention.

For example, it is assumed that the terminal device 100 is a mobile phone having four antennas (the mobile phone supports LTE 4 Layer MIMO and WiFi 2 Layer MIMO technologies). A user views a high-definition video on the terminal device 100 by using a WiFi network, and the terminal device 100 is in a WiFi signal weak field area (for example, a WiFi RSSI<−90 dBm), causing a frame freezing phenomenon sometimes occurring in the high-definition video (where the high-definition video frame freezing problem needs to be resolved by using a WiFi multiple-antenna technology). However, when the terminal device 100 is in a signal strong field (for example, an RSRP>−70 dBm) in an LTE network and is in an idle state (for example, periodically listening and paging), a multiple-antenna requirement is relatively low. Based on the foregoing use status, the processor 109 determines that the antenna use priority of the WiFi communications module 103 is the highest antenna use priority, and the antenna use priority of the LTE communications module 102 is the middle antenna use priority. Therefore, as shown in FIG. 10, during antenna configuration, the processor 109 configures two antennas (an antenna 2 and an antenna 3) for the WiFi communications module 103, and configures two antennas (an antenna 0 and an antenna 1) for the LTE communications module 102. In such a configuration, the WiFi communications module 102 can resolve the high-definition video frame freezing problem by using the 2 Layer MIMO technology, and the LTE communications module 102 can perform LTE paging and listening actions by using double antennas.

If at a moment, there is a VoLTE voice call from the LTE network, after the user answers the call, the communication status of the LTE communications module 102 changes, and the LTE communications module 102 reports status change information to the processor 109, so that the processor 109 performs antenna resource reconfiguration. In this case, the processor 109 determines, based on communication statuses of the communications modules, that the antenna use priority of the WiFi communications module 102 is the middle antenna use priority, and the antenna use priority of the LTE communications module 102 is the high antenna use priority. Therefore, as shown in FIG. 10, during antenna configuration, the processor 109 configures one antenna (the antenna 3) for the WiFi communications module 103, and configures three antennas (the antenna 0, the antenna 1, and the antenna 2) for the LTE communications module 102. In a new antenna configuration, the WiFi communications module 102 has at least one antenna that keeps a connection to an AP, and the LTE communications module 102 can also improve VoLTE voice quality by using a multiple-antenna technology.

Then, it is assumed that the user leaves home after disabling WiFi of the terminal device 100 and views a high-definition video by using an LTE network in an outside public place. In this case, both the WiFi communications module 103 and the LTE communications module report status change information to the processor 109, so that the processor 109 performs antenna resource reconfiguration. The processor 109 determines, based on communication statuses of the communications modules in this case, that the WiFi communications module 103 corresponds to the low antenna use priority, and the LTE communications module 102 corresponds to the highest antenna use priority. Therefore, as shown in FIG. 10, during antenna configuration, the processor 109 does not configure any antenna for the WiFi communications module 103, and configures four antennas (the antenna 0, the antenna 1, the antenna 2, and the antenna 4) for the LTE communications module 102. In a new antenna configuration, the LTE communications module 102 can improve high-definition video throughput performance by using a 4×4 MIMO multiple-antenna technology.

Figure 11:
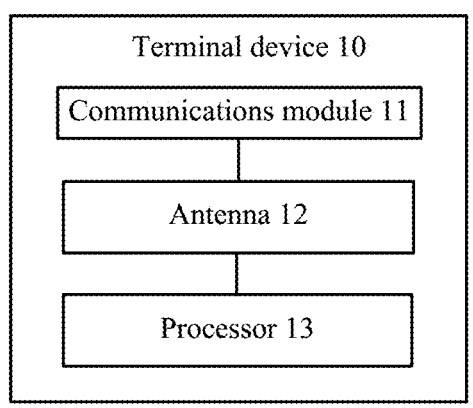
FIG. 11 is a schematic block diagram of a terminal device according to another embodiment of the present invention.

The antenna circuit configured to configure an antenna and the antenna configuration method in the embodiments of the present invention are described above in detail with reference to FIG. 1 to FIG. 10, and a terminal device according to an embodiment of the present invention is described below in detail with reference to FIG. 11. As shown in FIG. 11, the terminal device 10 includes a plurality of communications modules 11, a plurality of antennas 12, and a processor 13.

The processor 13 is configured to determine a communication status of each of the plurality of communications modules.

The processor 13 is further configured to determine an antenna use priority of each communications module based on the communication status of the communications module.

The processor 13 is further configured to configure an antenna for each communications module based on the antenna use priority of the communications module.

Therefore, the terminal device according to this embodiment of the present invention determines the antenna use priority of the communications module based on the communication status of the communications module, and configures antennas for different communications modules based on antenna use priorities of the communications modules, thereby improving scenario experience of a service user.

In this embodiment of the present invention, optionally, the processor 13 is configured to determine the antenna use priority of each communications module based on the communication status and a preset correspondence, and the preset correspondence includes a correspondence between the communication status and the antenna use priority.

In this embodiment of the present invention, optionally, the processor 13 is specifically configured to: determine, based on the antenna use priority of each communications module, a quantity of antennas allocated to the communications module; and configure the antenna for each communications module based on the quantity of antennas allocated to the communications module.

In this embodiment of the present invention, optionally, the processor 13 is specifically configured to determine, based on the antenna use priority of each communications module, a maximum quantity of antennas supported by the communications module, and an antenna quantity allocation principle for the communications module, the quantity of antennas allocated to the communications module.

In this embodiment of the present invention, optionally, the antenna quantity allocation principle is: determining, based on the antenna use priority of each communications module, a minimum quantity of antennas allocated to the communications module; determining, based on an average allocation manner and a quantity of remaining antennas, a quantity of antennas allocated to each communications module in a first antenna use priority set; and when the quantity of antennas allocated to each communications module in the first antenna use priority set is a maximum quantity of antennas supported by the communications module in the first antenna use priority set, determining, based on the average allocation manner and a quantity of remaining antennas, a quantity of antennas allocated to each communications module in a second antenna use priority set.

Communications modules in the first antenna priority set have a same antenna priority, communications modules in the second antenna priority set have a same priority, and the priority of each communications module in the first antenna priority set is higher than the priority of each communications module in the second antenna priority set.

In this embodiment of the present invention, optionally, the processor 13 is further configured to determine an antenna performance measurement result for each communications module.

In terms of configuring the antenna for each communications module based on the quantity of antennas allocated to the communications module, the processor 13 is specifically configured to configure the antenna for each communications module based on the antenna use priority of the communications module, the quantity of antennas allocated to the communications module, and the antenna performance measurement result and an antenna selection principle for the communications module.

In this embodiment of the present invention, optionally, the antenna selection principle is: for each communications module, selecting, in descending order of the antenna use priorities and descending order of antenna performance, a minimum preferred quantity of antennas corresponding to the communications module; selecting an antenna for each communications module in the first antenna use priority set from one or more remaining antennas in an alternate selection manner; and when a quantity of antennas selected for each communications module in the first antenna use priority set is the quantity of antennas allocated to the communications module in the first antenna use priority set, selecting an antenna for each communications module in the second antenna use priority set from one or more remaining antennas in the alternate selection manner.

The communications modules in the first antenna use priority set have a same antenna use priority, the communications modules in the second antenna use priority set have a same antenna use priority, and an antenna use priority of each communications module in the first antenna use priority set is higher than an antenna use priority of each communications module in the second antenna use priority set.

In this embodiment of the present invention, optionally, the processor 13 is further configured to: when determining that a first communications module in the plurality of communications modules does not use, in a preset time period, an antenna configured for the first communications module, configure the antenna configured for the first communications module for a second communications module in the plurality of communications modules, where an antenna use priority of the first communications module is higher than an antenna use priority of the second communications module; and when determining that the first communications module needs to use the antenna configured for the first communications module, reconfigure the antenna configured for the first communications module for the first communications module.

In this embodiment of the present invention, optionally, the processor 13 is further configured to determine a status of the terminal device.

In terms of configuring the antenna for each communications module based on the antenna use priority of the communications module, the processor 13 is specifically configured to configure the antenna for each communications module based on the antenna use priority of the communications module and the status of the terminal device.

In this embodiment of the present invention, optionally, the preset correspondence is: when the communication status is performing a voice service in a condition that a received signal strength indicator RSSI of a signal is less than a first preset value, a communications module corresponding to the communication status has a first antenna use priority; and when the communication status is performing the voice service in a condition that the RSSI of the signal is greater than or equal to the first preset value, a communications module corresponding to the communication status has a second antenna use priority. The first antenna use priority is higher than the second antenna use priority.

In this embodiment of the present invention, optionally, the plurality of communications modules include a communications module supporting a cellular communications technology and a communications module supporting a near field communications technology.

In this embodiment of the present invention, optionally, the communications module supporting the cellular communications technology is a Long Term Evolution LTE communications module, and the communications module supporting the near field communications technology is a wireless fidelity WiFi communications module.

In this embodiment of the present invention, optionally, before the processor 13 determines the communication status of each of the plurality of communications modules, the processor 13 is further configured to determine that a communications module whose communication status changes exists in the plurality of communications modules.

It should be noted that in this embodiment of the present invention, the processor 13 may be implemented by using a processing module.

A person of ordinary skill in the art may be aware that, in combination with examples of units and algorithm steps described in the embodiments disclosed in this specification, this application may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of operating a wireless communication device, the method comprising:
   communicating WiFi signals via a first antenna of the wireless communication device while a second antenna of the wireless communication device is used for communicating cellular signals;

determining that a priority of a first service is higher than a priority of a second service based on a communication status corresponding to the first service and a communication status corresponding to the second service;

in response to determining that the priority of the first service is higher than the priority of the second service, communicating WiFi signals to a first device via the first antenna and a third antenna of the wireless communication device for performing a first service while the second antenna is being used for communicating cellular signals to a second device for performing a second service;

determining that a priority of a third service is higher than a priority of a fourth service based on a communication status corresponding to the third service and a communication status corresponding to the fourth service; and in response to determining that the priority of the third service is higher than the priority of the fourth service, communicating cellular signals to the second device via the second antenna and the third antenna for performing a third service while the first antenna is being used for communicating WiFi signals to the first device for performing a fourth service.

2. The method according to claim 1, wherein the communicating cellular signals include LTE signals.

3. The method according to claim 1, wherein the first service includes a voice service or a video service.

4. The method according to claim 1, wherein the second service includes periodic paging service.

5. The method according to claim 1, wherein the third service includes a voice service.

6. The method according to claim 1, wherein the fourth service includes data browsing service.

7. The method according to claim 1, wherein before communicating WiFi signals to a first device via the first antenna and a third antenna of the wireless communication device for performing a first service while the second antenna is being used for communicating cellular signals to a second device for performing a second service, the method further comprising:

determining the priority the first service and the priority of the second service according to a preset correspondence table; and switching the third antenna to communicate WiFi signals when the priority of the first service is higher than the priority of the second service;

wherein before communicating cellular signals to the second device via the second antenna and the third antenna for performing a third service while the first antenna is being used for communicating WiFi signals to the first device for performing a fourth service, the method further comprising:

determining the priority the third service and the priority of the fourth service according to a preset correspondence table; and switching the third antenna to communicate cellular signals when the priority of the third service is higher than the priority of the fourth service.

8. The method according to claim 1, wherein communicating WiFi signals to a first device via the first antenna and a third antenna of the wireless communication device for performing a first service while the second antenna is being used for communicating cellular signals to a second device for performing a second service, further comprising:

communicating WiFi signals to a first device via the first antenna and a third antenna of the wireless communication device for performing a first service while the second antenna is being used for communicating cellular signals to a second device for performing a second service, wherein a priority of the first service is higher than a priority of the second service and status of the Wi-Fi signals is worse than status of the cellular signals;

wherein communicating cellular signals to the second device via the second antenna and the third antenna for performing a third service while the first antenna is being used for communicating WiFi signals to the first device for performing a fourth service, further comprising:

communicating cellular signals to the second device via the second antenna and the third antenna for performing a third service while the first antenna is being used for communicating WiFi signals to the first device for performing a fourth service, wherein a priority of the third service is higher than a priority of the fourth service and status of the cellular signals is worse than status of the Wi-Fi signals.

9. A terminal device, comprising:

at least one processor;

a memory;

a first antenna;

a second antenna; and a third antenna;

wherein the memory stores instructions that are executable by the at least one processor to instruct the terminal device to:

communicate WiFi signals via the first antenna while the second antenna is used for communicating cellular signals;

determine that a priority of a first service is higher than a priority of a second service based on a communication status corresponding to the first service and a communication status corresponding to the second service;

in response to determining that the priority of the first service is higher than the priority of the second service, communicate WiFi signals to a first device via the first antenna and the third antenna for performing a first service while the second antenna is being used for communicating cellular signals to a second device for performing a second service;

determine that a priority of a third service is higher than a priority of a fourth service based on a communication status corresponding to the third service and a communication status corresponding to the fourth service; and in response to determining that the priority of the third service is higher than the priority of the fourth service, communicate cellular signals to the second device via the second antenna and the third antenna for performing a third service while the first antenna is being used for communicating WiFi signals to the first device for performing a fourth service.

10. The terminal device according to claim 9, wherein the communicating cellular signals include LTE signals.

11. The terminal device according to claim 9, wherein the first service includes a voice service or a video service;

wherein the second service includes periodic paging service;

wherein the third service includes a voice service; and wherein the fourth service includes data browsing service.

12. An apparatus, applied in a terminal device, and the apparatus comprising:

at least one processor; and a non-transitory computer-readable storage medium coupled to the at least one processor and storing programming instructions for execution by the at least one processor, wherein the programming instructions instruct the at least one processor to:

indicate WiFi signals communicated via a first antenna of the wireless communication device while a second antenna of the wireless communication device is used for communicating cellular signals;

indicate WiFi signals communicated to a first device via the first antenna and a third antenna of the wireless communication device for performing a first service while the second antenna is being used for communicating cellular signals to a second device for performing a second service, wherein a priority of the first service is determined to be higher than a priority of the second service based on a communication status corresponding to the first service and a communication status corresponding to the second service; and indicate cellular signals communicated to the second device via the second antenna and the third antenna for performing a third service while the first antenna is being used for communicating WiFi signals to the first device for performing a fourth service, wherein a priority of the third service is determined to be higher than a priority of the fourth service based on a communication status corresponding to the third service and a communication status corresponding to the fourth service.

13. The apparatus according to claim 12, wherein the communicating cellular signals include LTE signals.

14. The apparatus according to claim 12, wherein the first service includes a voice service or a video service;

wherein the second service includes periodic paging service;

wherein the third service includes a voice service; and wherein the fourth service includes data browsing service.

* * * * *